Feb. 9, 1926.  1,571,944
E. F. HEARD ET AL
APPARATUS FOR PRESETTING LATHE TOOLS AND THE LIKE
Filed Nov. 10, 1924
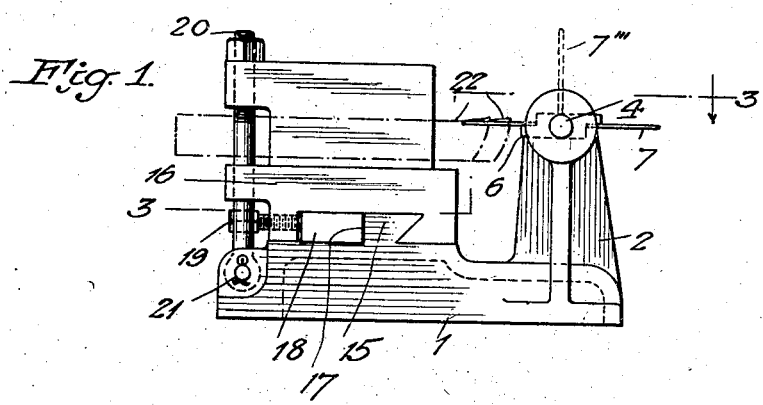
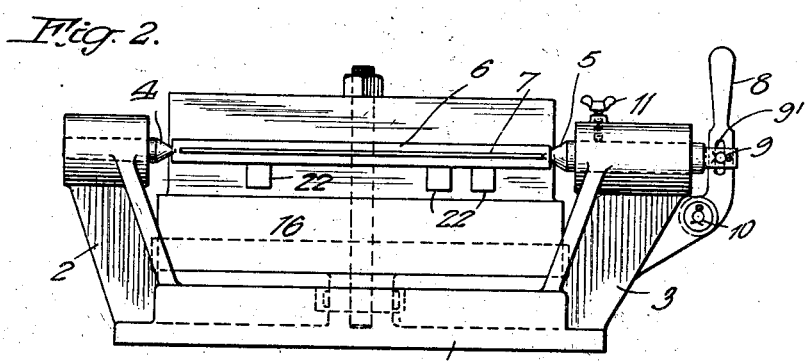
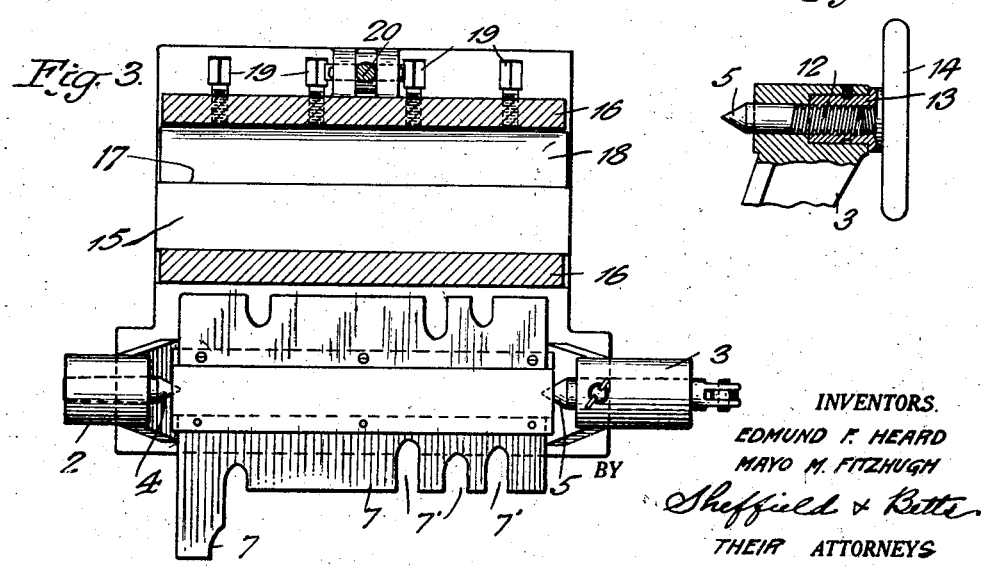
INVENTORS.
EDMUND F. HEARD
MAYO M. FITZHUGH
BY Sheffield & Betts
THEIR ATTORNEYS Patented Feb. 9, 1926.

1,571,944

UNITED STATES PATENT OFFICE.

EDMUND F. HEARD, OF ELIZABETH CITY COUNTY, AND MAYO M. FITZ HUGH, OF NEWPORT NEWS, VIRGINIA, ASSIGNORS TO NEWPORT NEWS SHIPBUILDING & DRYDOCK COMPANY, OF NEWPORT NEWS, VIRGINIA, A CORPORATION OF VIRGINIA.

APPARATUS FOR PRESETTING LATHE TOOLS AND THE LIKE.

Application filed November 10, 1924. Serial No. 748,944.

*To all whom it may concern:*

Be it known that we, EDMUND F. HEARD and MAYO M. FITZ HUGH, citizens of the United States, residing, respectively, in the county of Elizabeth City and State of Virginia, and the city of Newport News, county of Warwick, and State of Virginia, have invented certain new and useful Improvements in Apparatus for Presetting Lathe Tools and the like, of which the following is a full, clear, and complete description.

Our invention relates to apparatus for presetting lathe tools and the like, and has for its object the provision of a simple, accurate and efficient device of this character. More particularly, it relates to a setting-up gauge, jig or fixture to facilitate the setting-up of gang tools for use in a lathe, milling machine or boring machine to turn or form axles, shafts, bars and the like.

Another object of our invention is to permit a tool block to be fitted with its group of turning or forming tools all in their proper relation to each other and to the center of the lathe, boring mill or milling machine in which the axle, shaft or the like is being turned or formed. The blocks, with the tools preset therein, may then be transferred from our presetting device to the lathe as a single unit, thus saving the productive time of lathes that would otherwise be required in setting each individual tool or cutter directly in the tool block while attached to the lathe.

Our invention will be better understood from the following description taken in connection with the accompanying drawings and its scope will be pointed out in the appended claims.

In the drawings illustrating our invention;

Fig. 1 is an end view of our presetting device with a tool block thereon.

Fig. 2 is a front view of Fig. 1,

Fig. 3 is a section taken on the line 3—3 of Fig. 1.

Fig. 4 is an enlarged detail view of a modification of the adjustable center.

Referring to the drawings, in which the numeral 1 indicates a base or bed, having uprights or supporting arms 2, 3, which may be separate elements suitably secured to said base or integral therewith as shown.

Said arms 2, 3, respectively support centers 4, 5, for rotatably supporting a shaft 6 which carries a templet or gauge 7 suitably secured thereto. The templet 7 is provided with indentations 7' or projections 7" into which or against which the forming, cutting or turning tools may be set. The center 4 is preferably fixed in arm 2. Center 3 is made movable axially so that shaft 6, with its templet or gauge, may be readily removed for the substitution of other templets or gauges. This arrangement also permits adjustment to reduce the axial movement of shaft 6 to a minimum while permitting it to rotate freely. In the form shown in Fig. 2, the center pin 5 is slidable axially in arm 3 and its rear end is pivotally connected to a handle 8 by a pin 9, which is slidable in a longitudinal slot 9' in the handle 8, said handle being pivoted to arm 3 at 10. Thus, the center 5 is moved back and forth axially by moving the handle 8 about its pivot 10. The center 5 may be secured in any desired position by means of screw 11. In the modification shown in Fig. 4, the rear end of center pin 5 is threaded at 12 to engage in suitable threads in arm 3, or threaded collar 13 inserted therein, and may be adjusted by means of the hand wheel 14 suitably fixed thereon.

The bed 1 is provided with a suitable tool holder seat 15, parallel to the line of centers 4 and 5. In the present case, this seat is shown as of the dove-tailed or undercut type, adapted to receive the tool holder 16, and in practice corresponds to the tool holder seat of the lathe. The surface 17 is a predetermined distance from and parallel with the line between centers 4 and 5. The tool holder 16 is placed in the seat 15 as shown in Fig. 1 and a liner 18 is inserted adjacent the surface 17 to facilitate the positioning of the tool holder on its seat. The liner 18 is in width equal to or slightly less than the horizontal distance between the downwardly projecting rib on the lower surface of the tool holder and the surface 17. Thus, when placing the tool holder on its seat, the tool holder is lowered straight down and pulled back until the dove-tailed surfaces engage, when liner 18 may be inserted end-wise, and the dove-tails locked by tightening the screws 19 in a manner readily understood.

Tool holder 16 is then locked to the seat by a bolt 20 hinged to the bed at 21. In this manner, the tool holder 16 is secured in a presetting device in a position with respect to centers 4, 5, corresponding to the position of the tool holder in the lathe with respect to the lathe centers. The tools 22 may then be positioned with respect to the templet 7 and secured in the usual manner, after which the tool holder, with its tools properly positioned, may be transferred to the lathe for use, when desired.

When our invention is used with a lathe using double tool blocks or holders for providing a multiplicity of shapes, or to roughen and finish the same shape, shaft 6 may carry a plurality of templets, patterns or gauges, as indicated at 7''', so that various combinations of tool shapes and arrangements or both may be set up without removing shaft 6 from the jig or presetter.

From a consideration of the above description, taken in connection with the drawings, our invention will be apparent without further explanation, and the advantages set forth prior to the detailed description will readily be recognized. We do not wish to be understood as being limited to the details of form or arrangement of parts herein set forth, for various changes may be made by those skilled in the art without departing from the spirit or scope of our invention.

What we claim and desire to secure by United States Letters Patent is:

1. Apparatus for presetting tools for lathes and the like comprising centers similar to lathe centers, a gauge supported thereby and means for supporting a tool block in fixed relation with respect to said first mentioned centers and in a position corresponding to that of the tool block when on the lathe with respect to the lathe centers.

2. Apparatus for presetting tools for lathes and the like comprising means having centers similar to lathe centers adapted to support gauges, a gauge supported thereby and means for removably supporting tool holders in a fixed predetermined relation with respect to said centers, said gauge being adapted to permit a tool held by said holder to be properly positioned for subsequent use.

3. A device of the character described comprising a bed having centers supported thereon, a gauge rotatably supported in said centers, and a tool holder seat on said bed arranged to support a tool holder parallel with the line of said centers and a predetermined distance therefrom.

4. A device of the character described comprising a bed having centers supported thereon, a gauge supported by said centers and a tool holder seat on said bed having a dovetail slot and a straight surface parallel with and a predetermined distance from the center line of said centers, and means for securing a tool holder on said seat in said slot.

5. A device of the character described comprising a bed, a fixed and an adjustable center supported thereon, a gauge rotatably supported on said centers, and a tool holder seat on said bed arranged to support a tool holder parallel with the line of said centers and a predetermined distance therefrom.

6. A device of the character described comprising a bed, centers corresponding to lathe centers supported thereon, a gauge supported by said centers, means for adjusting one of said centers axially, a tool holder seat on said bed arranged to support a tool holder with respect to the line of said centers in a position corresponding to the position of the holder when on the lathe and means for locking a tool holder on said seat, said gauge being adapted to permit the positioning of a tool in said tool holder for subsequent use.

7. A device of the character described comprising a bed, centers corresponding to lathe centers carried thereby, a gauge rotatably supported on said centers, means for adjusting one of said centers axially, a tool holder seat on said bed arranged to support a tool holder with respect to the line of said centers in a position corresponding to the position of the holder when on the lathe and means for locking a tool holder on said seat.

EDMUND F. HEARD.
MAYO M. FITZ HUGH.